United States Patent [19]

Shapiro et al.

[11] Patent Number: 5,298,892
[45] Date of Patent: Mar. 29, 1994

[54] STACKED DISPLAY PANEL CONSTRUCTION AND METHOD OF MAKING SAME

[75] Inventors: Leonid Shapiro, Lakeside; William K. Bohannon; Randall S. Farwell, both of San Diego, all of Calif.

[73] Assignee: Proxima Corporation, San Diego, Calif.

[21] Appl. No.: 686,751

[22] Filed: Apr. 16, 1991

Related U.S. Application Data

[60] Division of Ser. No. 506,621, Apr. 9, 1990, abandoned, which is a continuation-in-part of Ser. No. 472,668, Jan. 30, 1990, abandoned, which is a continuation-in-part of Ser. No. 222,144, Jul. 21, 1988, abandoned.

[51] Int. Cl.$^5$ ............................................. G09G 3/363
[52] U.S. Cl. ..................................... 340/784; 340/805
[58] Field of Search ...................... 358/10, 139, 32, 34, 358/60, 29, 231, 236, 61, 168, 169, 164, 53, 93; 340/784, 811, 812, 813, 805, 703, 796, 767, 802, 701

[56] References Cited

U.S. PATENT DOCUMENTS

| | | | |
|---|---|---|---|
| 4,395,708 | 7/1983 | Lloyd | 340/784 |
| 4,411,496 | 10/1983 | Nonomura et al. | 359/93 |
| 4,415,921 | 11/1983 | Mulvanny et al. | 358/168 |
| 4,416,514 | 11/1983 | Plummer | 350/335 |
| 4,523,232 | 6/1985 | Kameda et al. | 358/169 |
| 4,568,975 | 2/1986 | Harshbarger | 358/139 |
| 4,642,693 | 2/1987 | Fuse et al. | 358/169 |
| 4,686,562 | 8/1987 | Yamanaka | 358/32 |
| 4,701,786 | 10/1987 | Yamanaka | 358/32 |
| 4,734,692 | 3/1988 | Husono et al. | 340/784 |
| 4,738,514 | 4/1988 | Stewart | 359/84 |
| 4,745,461 | 5/1988 | Shirai et al. | 358/32 |
| 4,769,639 | 9/1988 | Kawamura et al. | 340/793 |
| 4,772,948 | 9/1988 | Irvin | 358/139 |
| 4,838,655 | 6/1989 | Hunahata et al. | 350/337 |
| 4,857,906 | 8/1989 | Conner | 340/802 |
| 4,868,668 | 9/1989 | Tavernetti | 358/60 |
| 4,878,741 | 11/1989 | Fergason | 359/53 |
| 4,921,334 | 5/1990 | Akodes | 358/236 |
| 5,089,810 | 2/1992 | Shapiro et al. | 340/701 |

Primary Examiner—Ulysses Weldon
Assistant Examiner—Steve Saras
Attorney, Agent, or Firm—Bernard L. Kleinke; Jerry R. Potts

[57] ABSTRACT

A new display panel system includes a stacked display panel and drive units therefor. The drive units include a computer for adjusting for the individual gamma characterics of each one of the display panels for color balancing purposes and for causing the luminance of each panel to be maximized, or at least greatly increased for each intensity level or shading of each color.

9 Claims, 10 Drawing Sheets

SHADES OF RED AFTER ADJUSTMENT

STACKED DISPLAY PANEL CONSTRUCTION AND METHOD OF MAKING SAME

CROSS REFERENCE TO RELATED APPLICATIONS

This is a continuation-in-part of U.S. patent application Ser. No. 07/506,621, filed Apr. 9, 1990 entitled "STACKED DISPLAY PANEL CONSTRUCTION AND METHOD OF MAKING SAME" which is a continuation-in-part of U.S. patent application Ser. No. 07/472,688 filed Jan. 30, 1990, entitled "LIQUID CRYSTAL DISPLAY PANEL SYSTEM AND METHOD OF USING SAME", which is a continuation-in-part of U.S. patent application Ser. No. 07/222,144 filed Jul. 21, 1988 entitled "GRAY SCALE SYSTEM FOR VISUAL DISPLAYS" all three applications now abandoned. The foregoing patent applications are incorporated herein by reference.

TECHNICAL FIELD

The present invention relates, in general, to a stacked display panel system and a method of making it, in an improved manner. More particularly, the present invention relates to a stacked liquid crystal display panel system and method of making it, to improve the quality of the light images produced thereby.

BACKGROUND ART

Large screen projection displays have been in demand for use in meetings, eduction, and for public announcement. Such systems are typically used in brightly lighted locations such as offices, airport lobbies and other public places. Thus, a bright screen with multicolored images is very important.

To satisfy the demand for such display systems, several types of liquid crystal display panel systems have been proposed. Such systems, however, have typically been limited in the number of different colors produced, or have exhibited poor contrast ratios. Such limitations result from various factors. For example, the physical and electrical characteristics of the individual liquid crystal display panel assemblies for producing colors, typically vary in actual production.

In a stacked display panel construction, a series of display panels and associated polarizers or filters are arranged along an optical path. The relative luminance of the individual panels is also effected by the order in which the panel assemblies are disposed within a stacked arrangement; i.e., a panel disposed more closely to the light source generally exhibits greater light transmittance characteristics as compared to a panel which is disposed more remotely from the light source along the common optical path because of the induced heating by the light source.

Another problem with conventional liquid crystal display panel systems is that the light transmission characteristics of the individual panels in a stacked panel arrangement, also vary in actual production. Consequently, the contrast levels of a multiple number of panels arranged along an optical path, does not follow in a linear manner, thereby resulting in color distortion.

Not only do the abstract values differ from panel to panel in a stacked configuration where each panel is responsible for a portion of the visible color spectrum, but also the excitation or gamma curves (applied voltage versus relative luminance) for each panel vary widely in significant manners. Accordingly, even if the panels could somehow be matched at one intensity or shading level, it would be difficult, if not impossible, to cause the contrast levels of the stacked panel arrangement to be balanced from one panel to the next, in a stacked panel arrangement.

Because typical liquid crystal display panel exhibits a hysteresis effect as a function of the applied voltage, different hues or shades of color can be produced by multiplexing the individual pixels or by applying incremented voltage steps between the excited and unexcited states of the panel. While such a technique may produce colors with multiple hues, it has been difficult, if not impossible, for such panel systems to produce a large number of different colors with multiple shading levels, because the relative luminance between the different colored panel assemblies varies to such a great extent.

For example, in U.S. Pat. No. 4,416,514, there is disclosed a liquid crystal color filter, which includes a set of differently colored dichroic polarizers interposed with an equal number of voltage responsive twisted nematic liquid crystal cells, and a neutral polarizer. Each of the above described elements are arranged along an optical path in a predetermined manner for modifying the spectral content of visible light incident to the filter to produce any one of eight predetermined colors. Shades of the predetermined colors are achieved by varying the voltage applied to the individual liquid crystal cells.

While the above described patented system may produce a full colored display image, it was limited to only an eight color system, since it would be difficult, if not impossible, to balance the filter colors for different hues on a pixel by pixel basis, as the light transmission characteristics of each of the liquid crystal display panels vary slightly, due to manufacturing inconsistencies between like panels and due to the physical and electrical characteristics of the panels. Thus, color balancing for the entire unit is generally unsatisfactory for some applications. More particularly, if the generating voltage levels are varied by same amount for each panel, each panel will have a different amount of relative luminance, thereby resulting in a distortion of the resulting colored image on a pixel by pixel image basis.

SUMMARY OF THE INVENTION

Therefore, the principal object of the present invention is to provide a new and improved display panel system, and a method of making it, to produce improved light image characteristics, and yet be able to manufacture such a system according to modern mass production techniques.

Another object of the present invention is to provide such a new and improved display panel system, and a method of making it, wherein the system includes a stacked display panel construction, and wherein the display panel stages or assembles are balanced optically from assembly to assembly.

Briefly, the above and further objects are realized by providing a new and improved display panel system.

A new display panel system includes a stacked display panel and drive units therefor. The drive units include a computer for adjusting for the individual gamma characterics of each one of the display panels for color balancing purposes and for causing the luminance of each panel to be maximized, or at least greatly increased for each intensity level or shading of each color.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
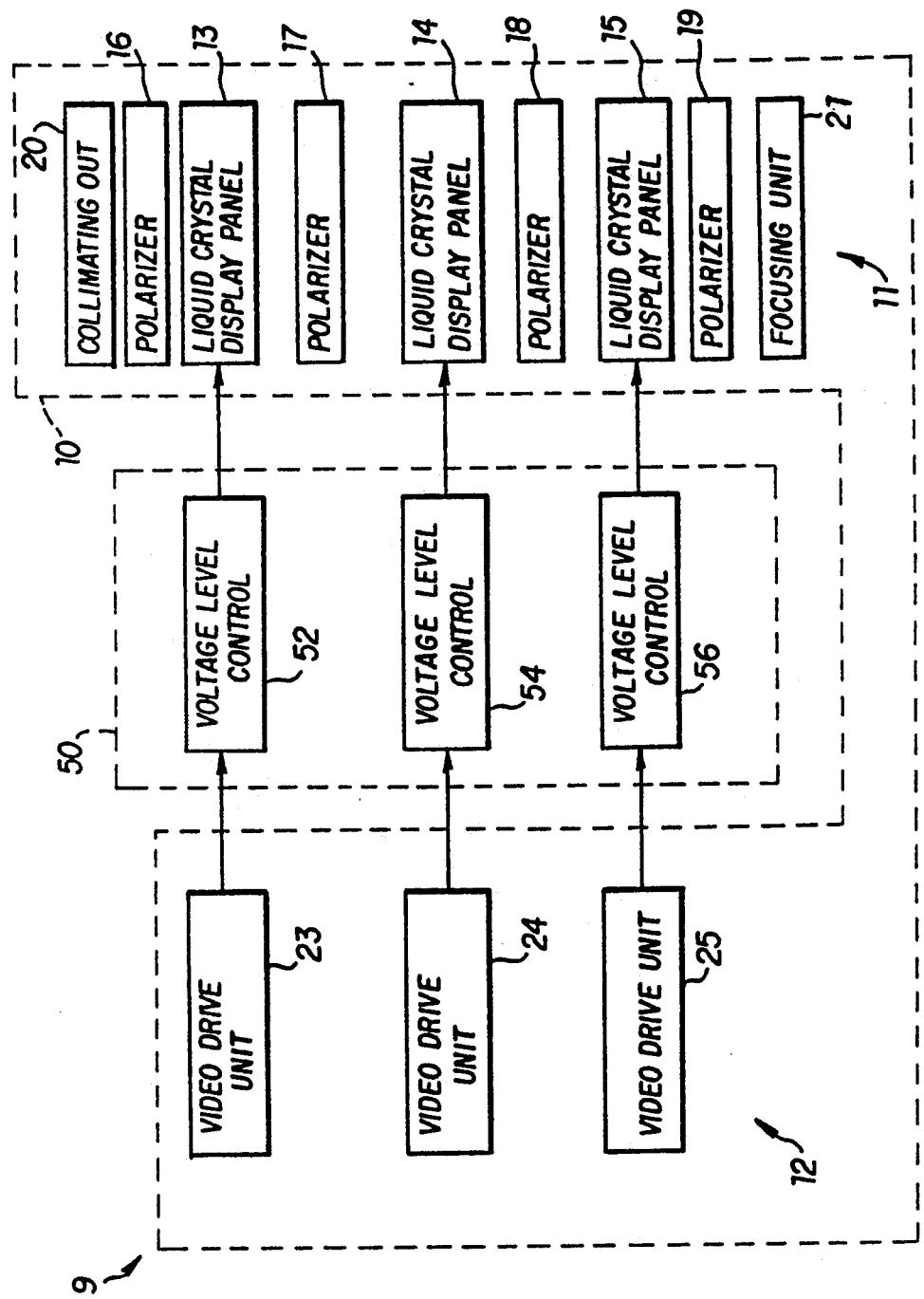
FIG. 1 is a block diagram of a display panel system, which is constructed in accordance with the present invention.

Referring now to FIG. 1, there is shown display panel system 9, which is constructed in accordance with the present invention, and which produces multicolored display images.

The display panel system 9 generally comprises a liquid crystal display panel assembly 10, which includes a liquid crystal display panel construction, shown generally at 11 and a video processing unit 12 which are more fully described in copending U.S. patent application Ser. No. 07/506,429 filed concurrently herewith, and foregoing mentioned U.S. patent application Ser. No. 07/472,668 which are incorporated herein by reference.

The panel construction 11 includes a set of nematic liquid crystal display panels 13, 14, and 15 which are disposed along a common optical path, which includes a collimating unit 20 and focusing unit 21 for directing light along the common optical path. The panel construction 11 also includes a set of spaced apart polarizers 16, 17, 18, and 19 which are also interleaved with, and optically aligned with the display panels 13, 14, and 15 along the common optical path. The display panels may also be highly twisted or supertwisted, active matrix, liquid crystal display panels.

The gamma curve adjustment system 10 generally comprises a linearization network 50 having a set of voltage level control circuits 52, 54, and 56 connected to the respective ones of the display panels 13, 14, and 15, for adjusting the initial direct current voltage applied to each one of the respective liquid crystal display panels to utilize substantially the full gamma curve characteristic for each respective panels, as will be explained hereinafter in greater detail. The linearization network 50 also tracks or follows the respective gamma curves characteristic for each one of the panels 13, 14, and 15, to permit the contrast level of the panel assembly 11 to be adjusted, without color distortion as will be explained hereinafter in greater detail.

Each of the voltage level control circuits 52, 54, and 56 is coupled between the individual liquid crystal display panels 13, 14, and 15 respectively, and a set of associated video drive units 23, 24, and 25 respectively. The drive units 23, 24, and 25 form part of the video processing unit 12. Each of the video drive units 23, 24, and 25 are also coupled to their respective liquid crystal display panels 13, 14, and 15 by suitable means (not shown), and are more fully described in the foregoing mentioned copending U.S. patent application Ser. No. 07/472,668.

Each one of the liquid crystal display panels is used for a different color, and exhibits a different relative luminance as a function of the voltage applied to the respective liquid crystal display panels, such as panels 13, 14, and 15.

Figure 4:
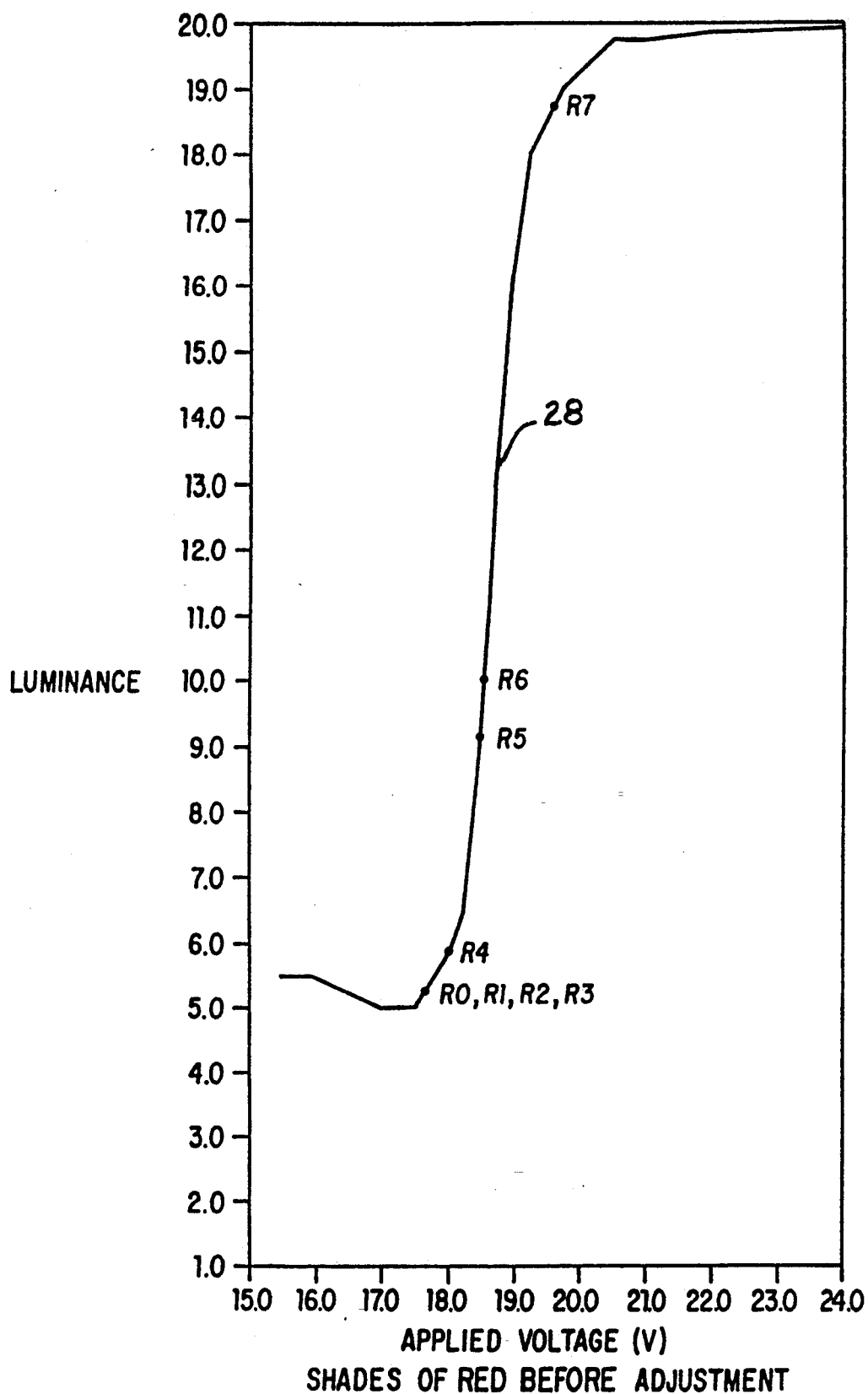
FIGS. 4-10 are graphs useful in the understanding of the present invention.
Figure 5:
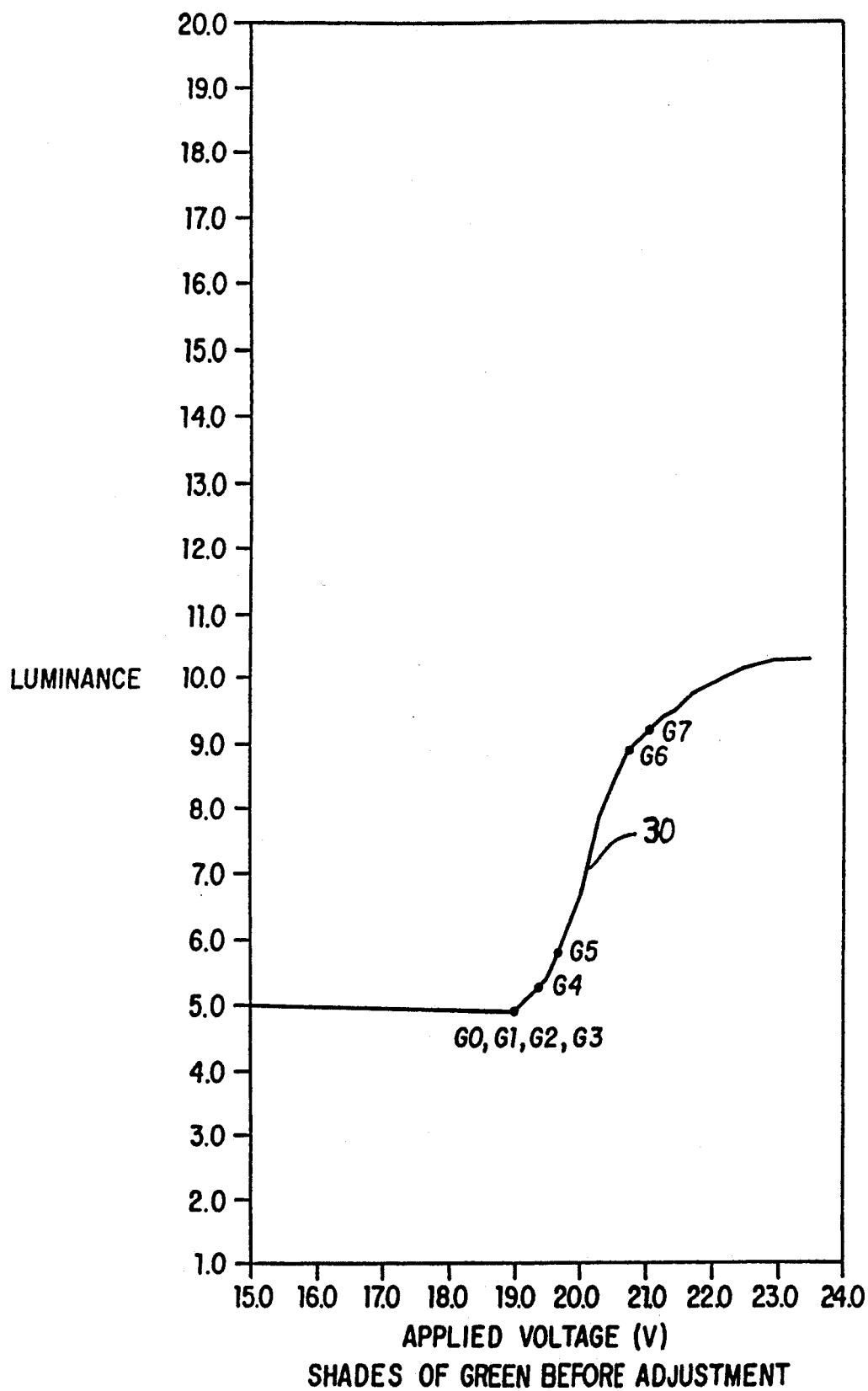
Figure 6:
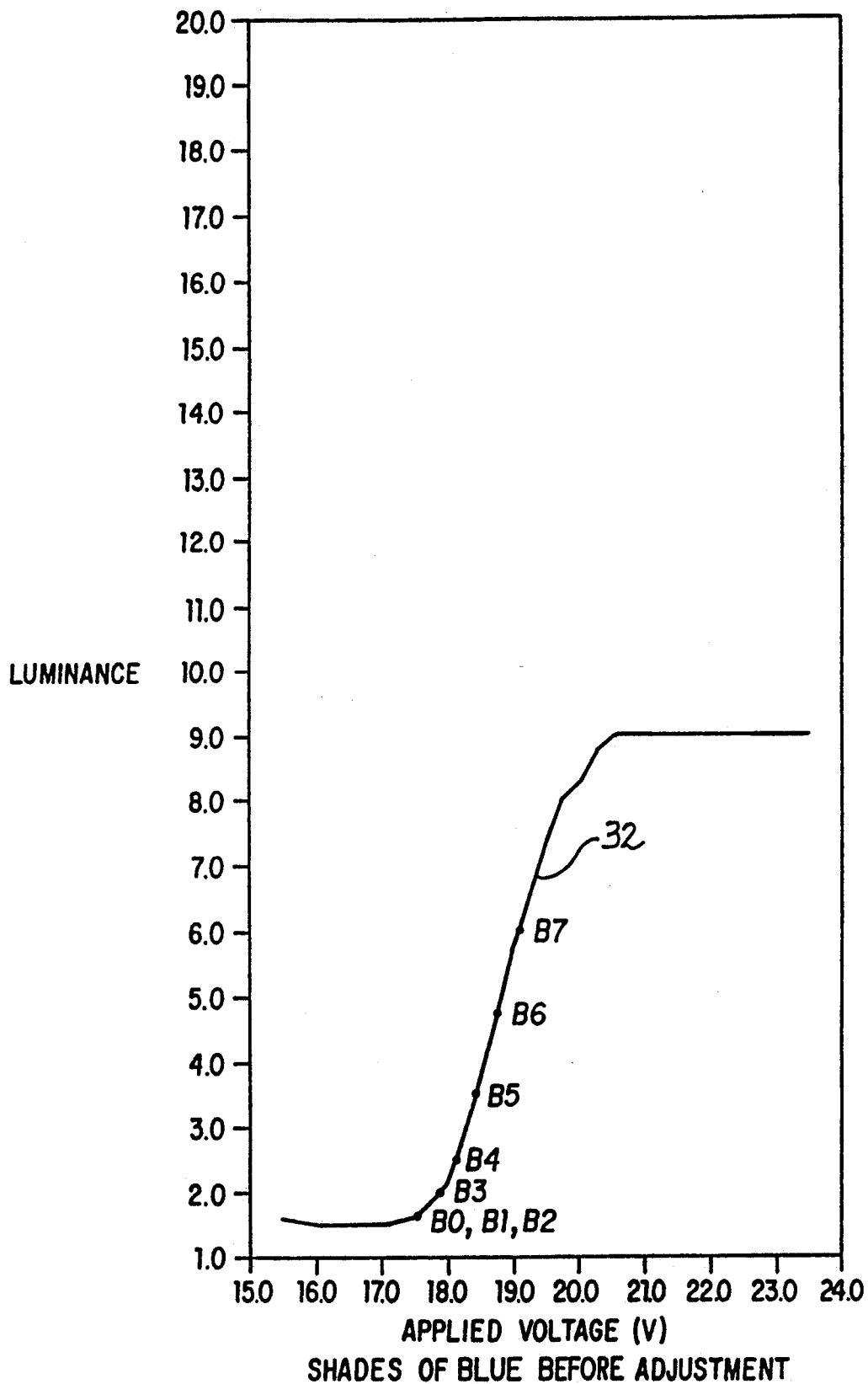

FIGS. 4, 5, and 6 show three typical gamma curves 28, 30, and 32 for panels 13, 14, and 15 respectively. As each of these curves is substantially identical in form, only gamma curve 28 will be described hereinafter in greater detail. In operation, the individual voltage level control circuits 52, 54, and 56 are adjusted to provide an initial direct current reference voltage ($V_{ref}$) for their respective liquid crystal display panels 13, 14, and 15, to enable a maximum amount, if not a high percentage of relative luminance to be produced by each of the panels 13, 14, and 15. Thus, according to the present invention, the assembly 10 enables a high percentage, if not a maximum percentage, of luminance to be achieved for each level of color intensity displayed for each pixel.

Considering now the linearization network 50 in greater detail with reference to FIGS. 1 and 2, each of the voltage level control circuits 52, 54, and 56 are similar to one another, except as will be explained hereinafter in greater detail. Accordingly, with reference to FIG. 2, only control circuit 56 will now be described.

Figure 2:
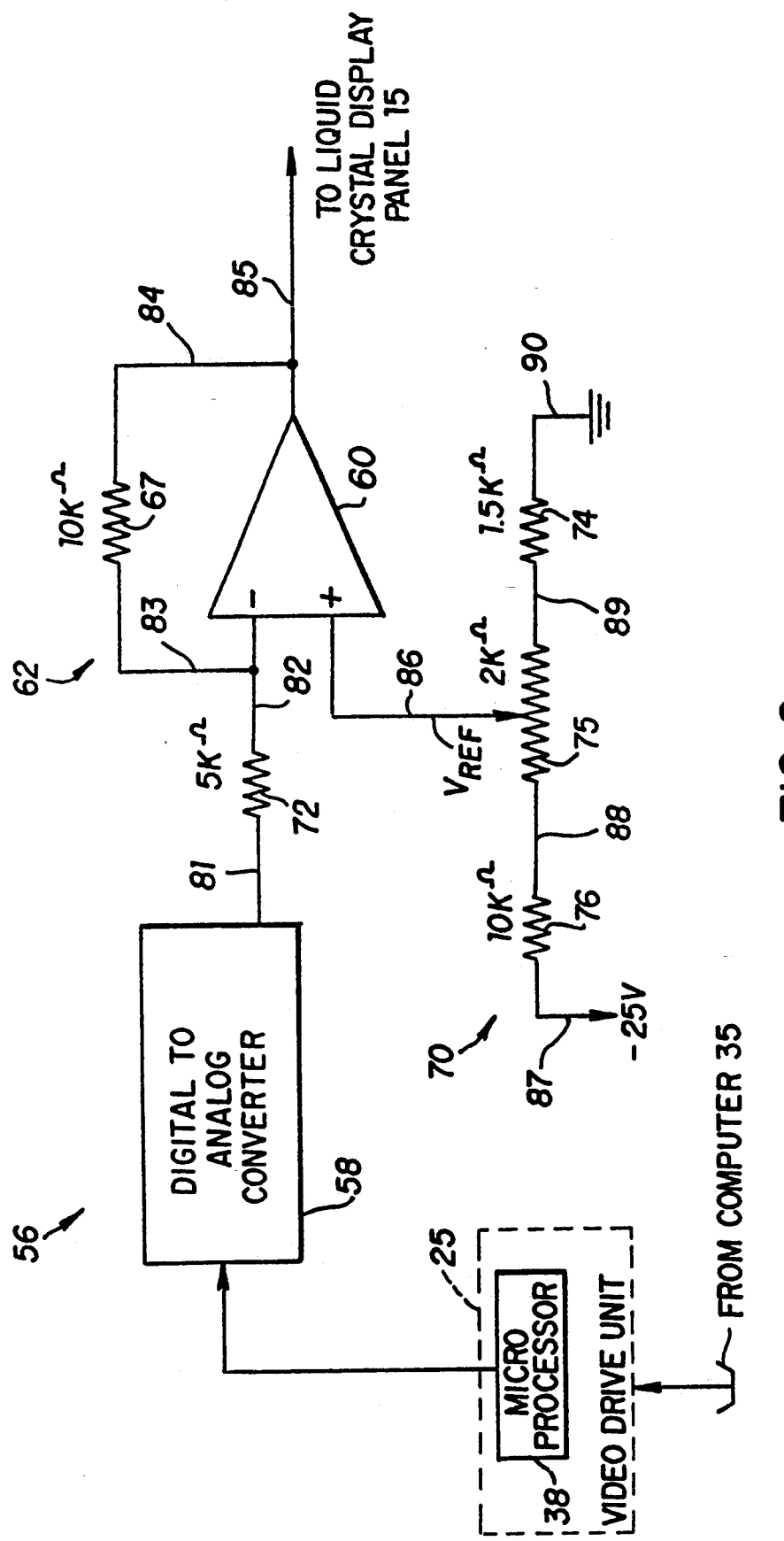
FIG. 2 is a symbolic block circuit diagram of a voltage level control unit of the system of FIG. 1.

Considering now the voltage level control circuit 56 in greater detail with reference to FIG. 2, the voltage level control circuit 56 is responsive to digital signals supplied by a microprocessor 38 disposed within the video drive unit 25. As more fully explained in the foregoing mentioned pending patent applictions, each one of the digital signals supplied by the microprocessor 38 is indicative of a given shading or color level for a displayable pixel forming part of the image produced by the panel assembly 10. More particularly, the voltage level control circuit 56 supplies a selected operating voltage level to the panel 15, which, in turn, enables each displayable pixel to be displayed with a maximum, if not a relative high percentage of relative luminance for helping to contrast one shading level from another.

In order to convert the digital signals supplied by the microprocessor 38 into an operating voltage level to maximize contrasting shading levels, the voltage level control circuit 56 includes a digital to analog converter 58 for converting digital signals from the computer 38, into analog voltage levels indicative of the different panel operating voltage levels for each color intensity level, to maximize, or at least to increase greatly the luminance of contrasting shading levels.

The voltage level control circuit 56 also includes a differential amplifier 60 for amplifying the analog voltage signal supplied by digital to analog converter 58 into an appropriate operating voltage level for the panel 15. In this regard, the control circuit 56 also includes a feedback gain control arrangement 62 for determining the amount of gain for the input signal to the amplifier 60.

In order to adjust the direct current reference voltage $V_{ref}$ on lead 86 for panel 15, relative to the various operating voltage levels for the panel, the voltage level control circuit 56 also includes a direct current voltage offset arrangement 70.

Considering now the digital to analog converter 58 in greater detail with reference to FIG. 2, the digital to analog converter 58 tend to maximize the number of discrete operating voltage levels between the threshold voltage level $V_T$ and the saturation voltage level $V_{SAT}$. The digital to analog converter 58 is also selected to have discrete voltage level steps or increments, which are balanced with the voltage increment levels produced by the digital to analog converters in each of the other control circuits 52 and 54. It should, therefore, be understood that the digital to analog converters of each one of the control circuits perform similar functions but will necessarily have different voltage increment step capabilities to compensate for the individual operating characteristics of their corresponding display panels 13, 14, and 15 respectively.

Considering now the feedback gain arrangement 62 in greater detail with reference to FIG. 2, the feedback gain arrangement includes two current limiting resistors 67 and 72 which are selected to cause the differential amplifier 60 to amplify the output voltage from the digital to analog converter 58, to an appropriate voltage. In this regard, like the digital to analog converters, the resistance values of the resistors in the other feedback gain arrangements for control circuits 52 and 54, may be different than the resistance values of resistors 67 and 72, although they perform a similar function.

As best seen in FIG. 2, the resistor 72 connects the output of the digital to analog converter at 81 to the negative or inverting input 82 of the differential amplifier 60. The negative or inverting input 82 of the amplifier 60 is also coupled through resistor 67 via conductors 83 and 84 to an output 85 of the amplifier 60. Resistor 72 is a 5 kohm resistor while resistor 67 is a 10 kohm resistor.

Considering now the differential amplifier 60 in greater detail with reference to FIG. 2, the output 85 of the amplifier 60 is connected to the liquid crystal display panel 15 to provide a selected operating voltage for attempting to maximize contrasting shading or color levels, so that each pixel energized at one level will be easily distinguished from every other pixel energized at different shading levels of the same basic color.

In order to provide a differential voltage level reference as well as to provide a direct current voltage level reference for utilizing to the fullest extend possible the full gamma curve of the panel 15 to be utilized in response to changing shading or color levels, the noninverting or positive input of the amplifier 60 is coupled to the offset adjustment arrangement 70 by a conductor 86.

Considering now the offset adjustment arrangement 70 in greater detail with reference to FIG. 2, the offset arrangement 70 consist of a manually adjustable potentimeter 75 which has its wiper or tap connected to the noninverting input of amplifier 60 by the conductor 86.

The offset arrangement also includes a pair of voltage divider resistor 74 and 76 for providing the proper reference voltage to the amplifier 60 as a function of the resistance setting of potentimeter 75.

Resistor 74 is coupled to ground by conductor 90 and the potentimeter 75 by conductor 89. The resistor 76 is coupled to a negative voltage source (not shown) by conductor 87 and the opposite terminal of potentimeter 75 by conductor 88. Resistor 74 is a 1.5 Kohm resistor, resistor 76 is a 10 Kohm resistor and potentimeter 75 is a 2.0 Kohm potentimeter.

Considering now the operation of the system 9 in greater detail with reference to the gamma curves illustrated in FIGS. 4 to 10. The gamma curve 28 illustrates the relative luminance of panel 13 as a function of the voltage applied by the voltage level control circuit 52 to the panel 13.

The gamma curve 28 is developed by positioning the liquid crystal display panel assembly 10 on an overhead projector 40 and focusing the light output of the system 10 into the projection lense of the overhead projector 40 to display an image (not shown) on a viewing screen or surface 43. The light source of the overhead projector 30 directs light into the collimating unit 20 for collimating the light. The system 10 is then electrically activated so that each panel (and all the associated displayable pixels within the panels) 13, 14, and 15 is placed in a saturated state by their associate voltage level control circuits 52, 54, and 56 respective, thus, enabling the panel construction 11 to pass noncolored light or light exhibiting the maximum relative luminance. This maximum relative luminance has an associated direct current reference or saturation voltage ($V_{SAT}$) which is measured by a user and record to form part of the gamma curve 28.

A processor program 100 is then activated by a user to cause the microprocessor 30 to generate a test pattern for displaying on the screen 43. The test pattern consists of three sets of discrete shading or color level setting, one set for each respective panel. Each set is substantially identical so only one will be described hereinafter.

Figure 3:
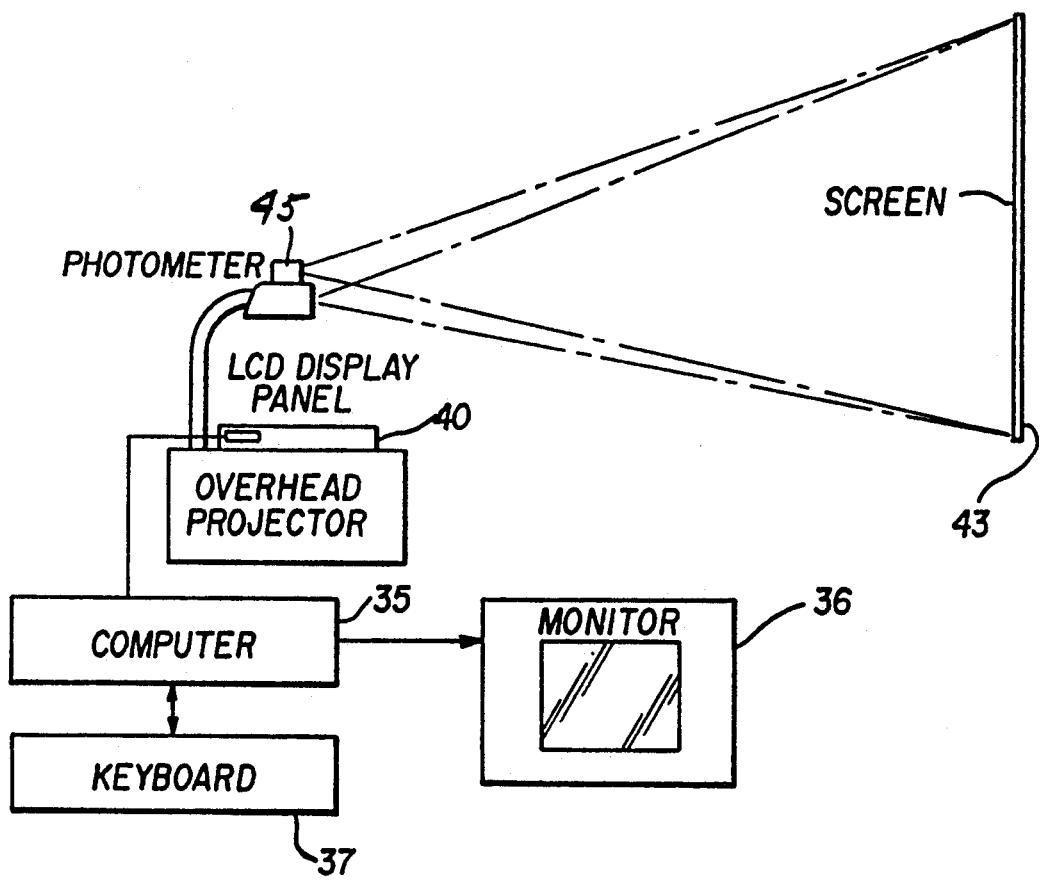
FIG. 3 is a diagrammatic and block diagram view of a display panel construction of the system of FIG. 1, illustrating it being used in a conventional overhead projector as controlled by a computer.

Depending upon the type of computer that is driving the system 9, various shades of colors will be available. For example, a computer 35 (FIG. 3) is capable of producing at least 8 different shades of color where each shade is represented by a discrete digital code. These discrete colors are capable of being combined either in graphic or text form by the computer 35 to produce a display image which may be displayed on the screen of an associated video monitor; such as monitor 36 or on the viewing screen 43. Ideally the shading or contrast levels in the displayed images should be substantially the same as between the image displayed on the monitor 36 and the image displayed on the screen 43. The processor program 100 enables the system 9 to be adjusted so that the full gamma curve 28 can be utilized so the system 9 can produce a full spectrum with colors.

As each level of shading or color is sequentially displayed on the screen 43, a user manually adjusted the reference potentimeter, such as potentimeter 75, to vary the direct current voltage applied to the panel 13 and using a photometer 45 measures the relative luminance with calibrated red, blue and photic filters of the panel 13 as a function of the applied voltage.

The program 100 generates a test pattern of 8 discrete shading or color levels and causes the drive units to generate signals for producing on a screen by screen basis each individual discrete level within the 8 discrete levels. The program code for program 100 is assembled in 870451 assembly language and is attached to this application as appendix A and represents the actual relative luminance of the panel 13 for each of the individual 8 shading or color levels as measured by a user.

To obtain each plotted point, the selected level is displayed and then using the photometer the relative red, green, or blue luminance of the screen 43 is measured as the potentimeter 75 is varied between $V_T$ and $V_{SAT}$. Whenever the relative luminance for the displayed level is distinguished from the next lower level, the measured relative luminance is recorded.

As the test pattern starts with maximum color level (level 0), this represents the darkest shade and the relative luminance will be a function of the threshold voltage (VT). This relative luminance level is also recorded as a function of the applied voltage to form another part of the gamma curve.

Ideally, to provide the greatest contrast between levels 0 and level 7, levels 0 to 7 should be equally spaced apart on the gamma curve 28 between $V_T$ and $V_{SAT}$.

The above disclosed process is repeated until all 8 levels of shading have been recorded to produce the gamma curve 28. The process is then repeated for the other panels to produce the other gamma curves 30 and 32. It should be noted that when recording the relative luminance level of the panels 13, 14, and 15, blue, red, and green filters (not shown) are used in the photometer 34 for recording the relative luminance as a function of applied voltage.

As best seen in FIG. 4 with respect to the individual shading levels of the blue panel 13, certain of the shading levels 0–3 were not distinguished from relative luminance at the threshold voltage level. Moreover, the upper shading level 7 was not disposed near the saturation voltage level. Thus, the full gamma curve is not utilized.

Figure 7:
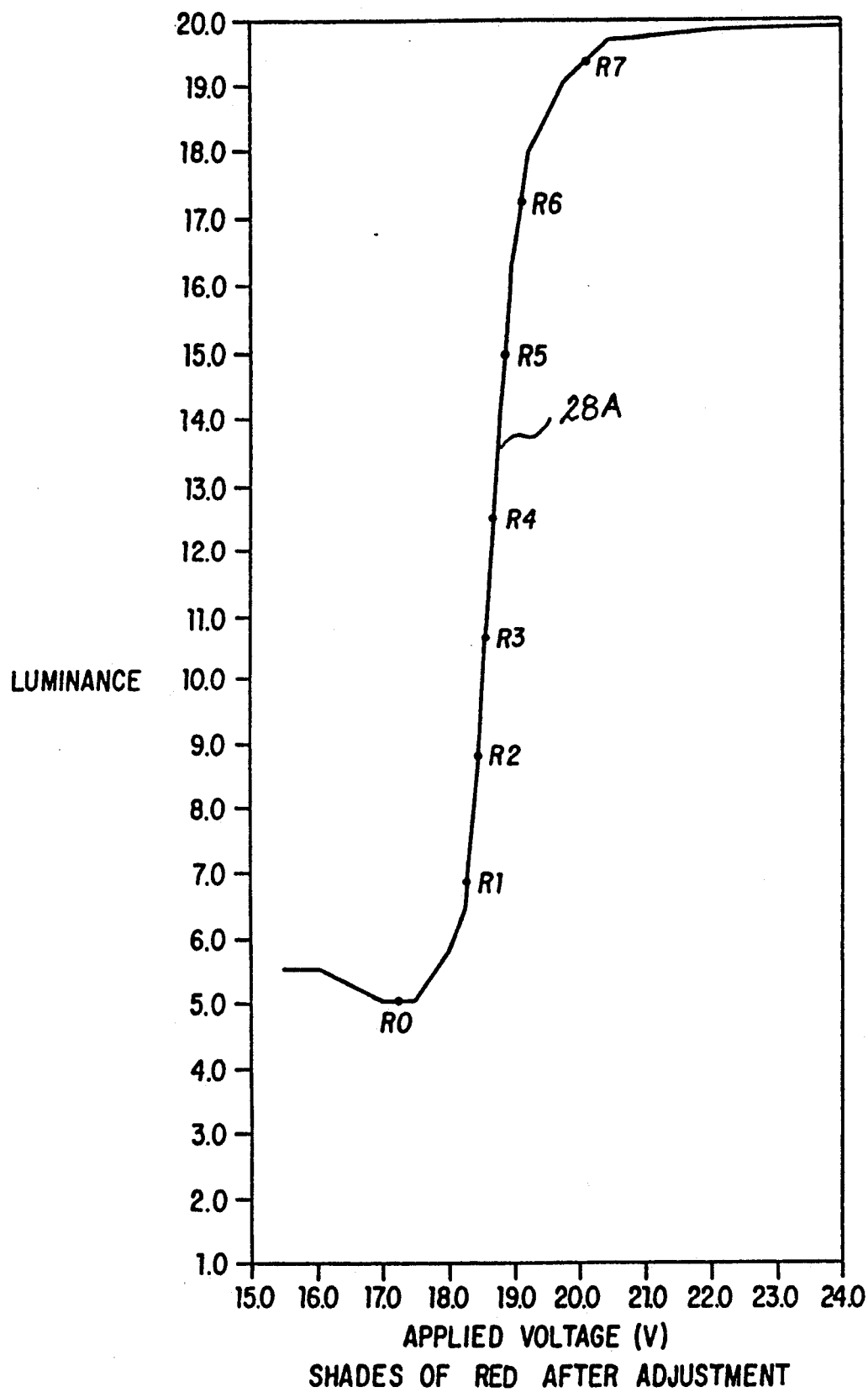
Figure 8:
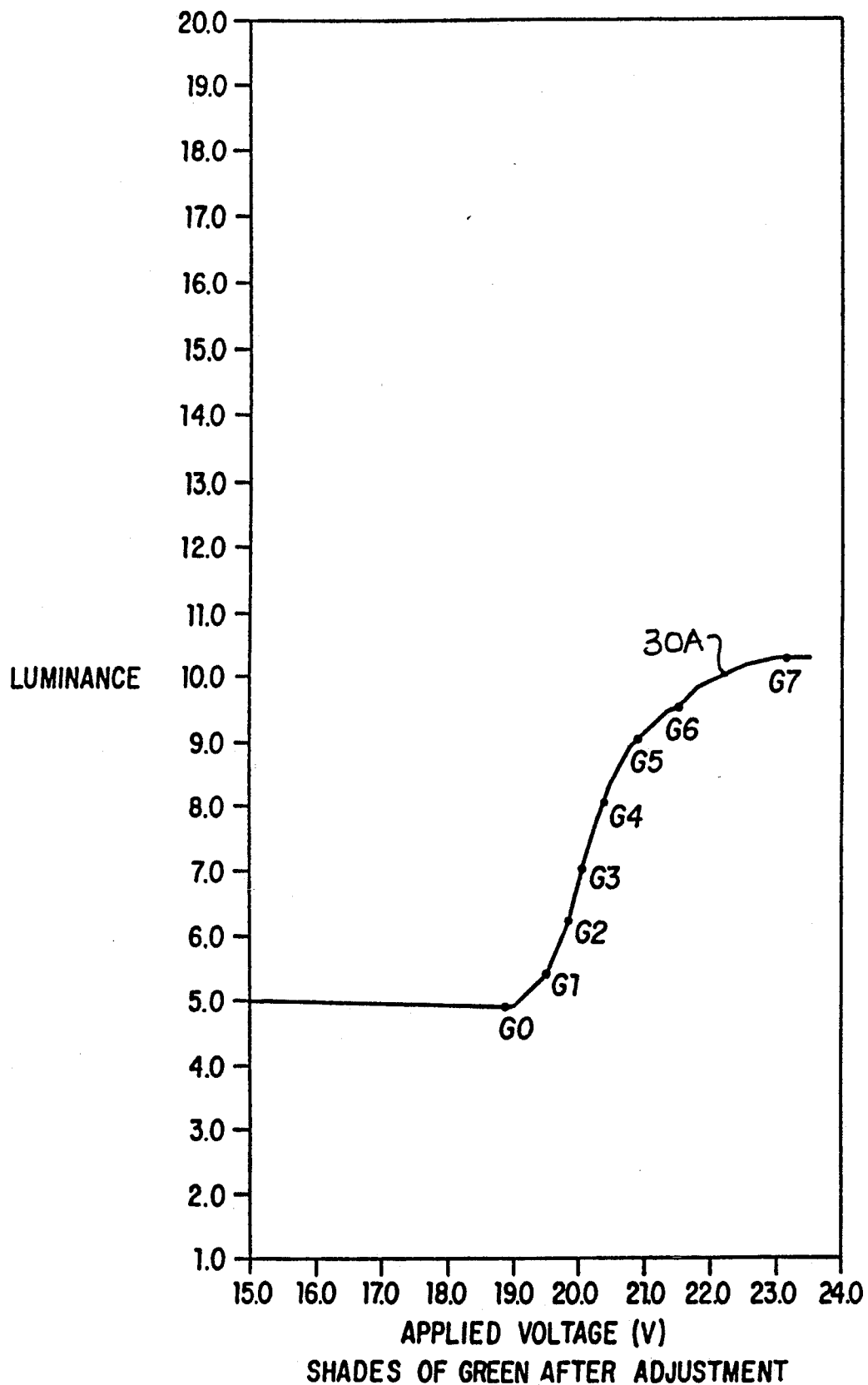
Figure 9:
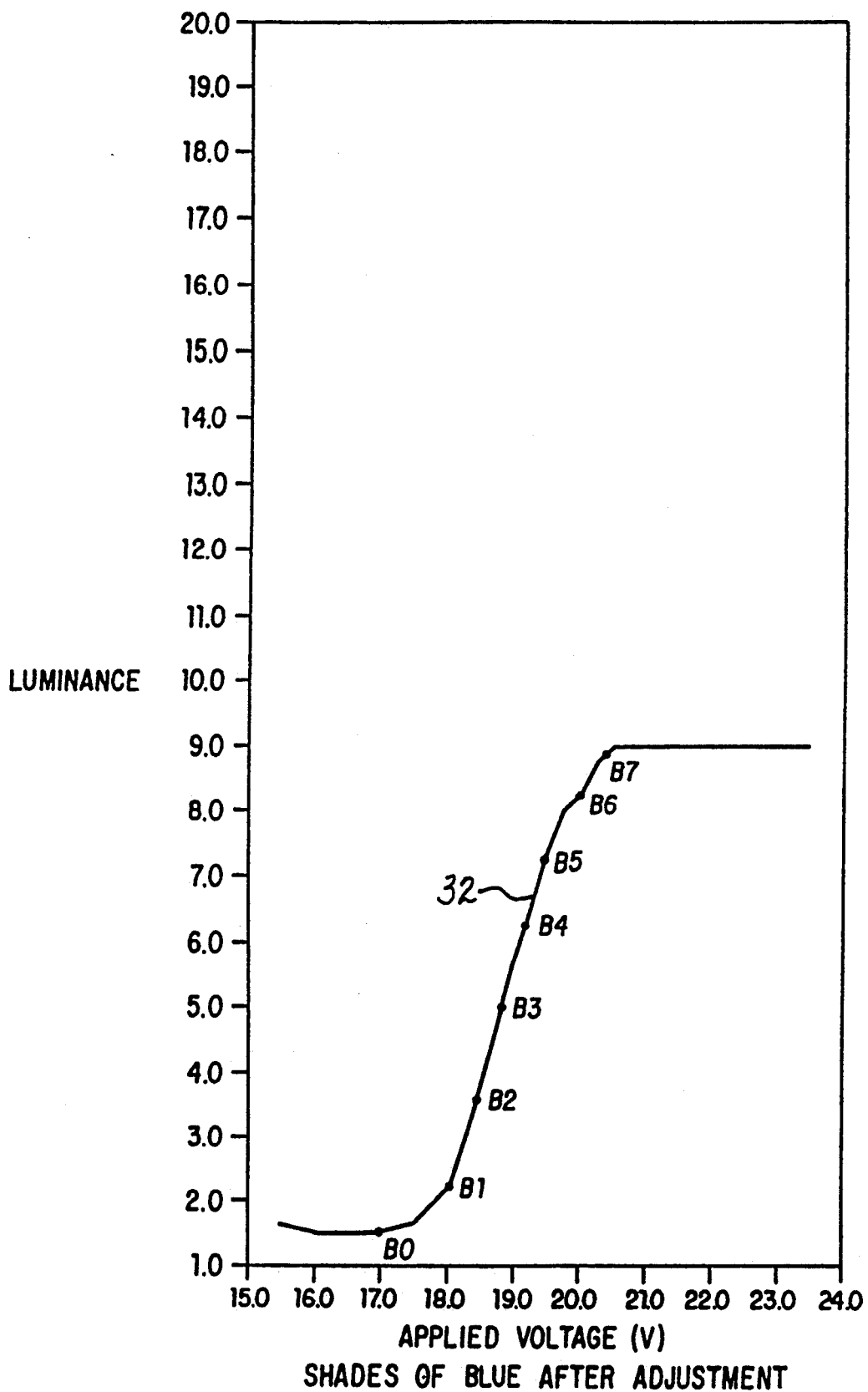

Referring now to FIG. 2, the digital signals generated by the microprocessor 38 correspond to the discrete shading levels. Accordingly, after determining the gamma curve response of the panels 13, 14, and 15, the microprocessor 38 is programmed by the user via a direct current voltage default program 200 to adjust the operating voltage to utilize the full gamma curve. More particularly, for example, with reference to the blue panel, an offset of 18 levels is established to better use the gamma curve 28. Thus when a level 1 shading signal is received by the microprocessor 38 from the computer 35, the microprocessor which convey the level 1 shading signal into a psuedo level signal indicative of level 19 so that the output voltage of amplifier 60 will correspond to a level 19 applied voltage as opposed to the actual level 1 signal. In this manner, microprocessor 38 generates a series of pseudo signal that increment and decriment the applied voltage to maximum relative luminance between the discrete shading or color levels. FIGS. 7–9 illustrate the respective gamma curve 28A, 30A, and 32A and the relative luminance for the discrete shading levels when the microprocessor 38 has been programmed to offset the digital signals as described above.

Figure 10:
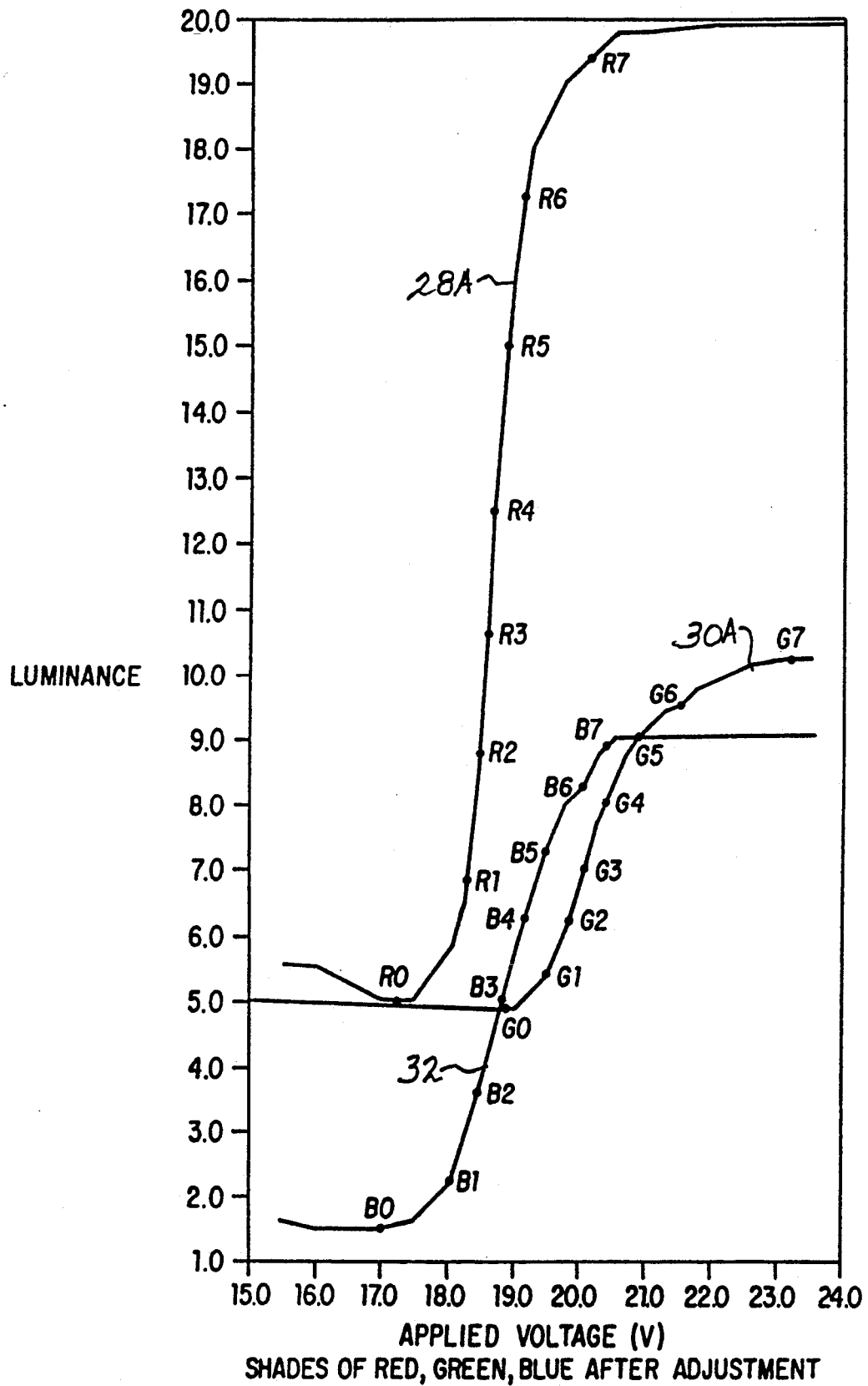

Considering now the gamma curves 28A, 30A, and 32A in greater detail with reference to FIG. 10, it will be noted that when the three gamma curves are superimposed on the same graph that they have substantially different discrete level shifts over the full 8 discrete levels. For example, the relative luminance of the red panel varies between 5.5 cd/m² and 19.7 cd/m², as the applied voltage varies between $-17.5$ volts ($V_T$) and $-20.5$ volts ($V_{SAT}$).

Comparing the green panel between threshold voltage of $-17.5$ volts and the saturation voltage of $-21.5$ volts, the relative luminance varied between 5.0 cd/m² and 10.5 cd/m².

From the foregoing, it should be clear that the step voltage changes vary substantial between different panels. To compensate for these differences, each of the d/a converters associated with the voltage level control circuits, such as d/a converter 58 have different step voltage responses that are selected to balance the color contrast between the panels 13, 14, and 15.

In order to enable a user to achieve the contrast balance, the user may press a selected function key on a keyboard or utilize other equivalent means such as a remote control infrared transmitter coupled to the microprocessor 38 by an infrared link.

Attached hereto as Appendix A is a source code listing of a firmware computer program stored in the microprocessor 38 for controlling the operation of the system 9. At pages 21, 43 through 49 of the appended Appendix A, there is disclosed the source code for controlling the tracking operation.

Therefore, the system 9 enables eight optimum operating levels for each one of the three color stages. In this regard, when the computer 35 calls for a given duty cycle level of color intensity to be generated by a given panel as explained in the foregoing patent applications, the microprocessor 38 provides a direct current bias signal for the given panel to bias the operation of the panel at the top of the luminance curve, so that when the computer 38 calls for a given intensity level, that designated level is optimized, since the intensity level voltage supplied to the panel is off-set by the d.c. bias voltage from the amplifier 60, thereby providing an optimized image display. The optimized image display is one where the luminance is of a sufficiently high relative value, and the contrast is also of a sufficiently high value. This voltage values corresponding the given bias level for a given computer 35 and a given panel are stored in the gamma curve look-up table found in the firmware to cause the amplifier 60 to generate the desired bias voltage level, for the top portion of the gamma curve. The contrast consideration takes into account that a manual contrast input (not shown) for the system 9 provides only a single decrement or increment, and yet the firmware determines three corresponding decremental or incremental changes in the voltage levels for the three different color panels of the system 9.

Therefore, it has been discovered that by determining a single d.c. biasing offset voltage for each panel for a given type of computer 35, such as a Mac II personal computer, the multiplexed duty cycle color intensity levels supplied to a given panel, as explained in the foregoing patent applications, is optimized automatically by causing the desired distribution of operating points along the gamma curves as shown in FIGS. 7–9 for the eight given color intensity levels for determination of the off-set d.c. voltage is selected in the manner as described in the appended Appendix B. The off-set bias voltage for given panels and given computers are stored in the look up table in the firmware of Appendix A.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for adjusting the gamma characteristics of liquid crystal display panel means to optimize substantially the number of discrete optically distinguishable shading levels of a displayed image, said liquid crystal display panel means including a plurality of electrically operable pixel elements, each pixel element being energizable to only a fully on state or a fully off state for exhibiting contrasting pixel images in accordance with the gamma characteristics of the liquid crystal display panel means, comprising:

using the liquid crystal panel means for producing the displayed image repetitively over a large number of successive frames of video information;

generating a plurality of biasing signals, said plurality of biasing signals including a direct current threshold voltage level signal and a direct current saturation voltage level signal for helping to define the gamma characteristics of the liquid crystal display panel means;

energizing individual ones of said plurality of electrically operable pixel elements with said plurality of biasing signals so they can exhibit resulting pixel images when energized with a gray scale drive signal;

quantizing a video signal into a plurality of gray scale drive signals, each individual gray scale drive signal being indicative of one of a multiple number of different luminance levels including a maximum luminance level and a minimum luminance level;

energizing individual ones of said plurality of electrically operable pixel elements with individual ones of said plurality of gray scale drive signals so each resulting pixel image exhibits one of said multiple number of different luminance levels over a large number of luminance levels; and adjusting said direct current saturation voltage level while energizing said plurality of electrically operable pixel elements with a certain individual one of said plurality of gray scale signals to adjust the gamma characteristics of the liquid crystal panel means to substantially maximize the luminance levels of the individual pixel images;

whereby a more uniform distribution of resulting distinguishable pixel images is produced in accordance with the adjusted gamma characteristics when said plurality of electrically operable pixel elements are energized by said gray scale drive signals to produce a large number of different shading levels.

2. A method according to claim 1 wherein said step of using liquid crystal panel means further includes:

aligning at least two liquid crystal display panels along a common optical path;

interleaving polarizers with said display panels for facilitating the passing of noncolored light when said panels are in an excited deselected states and for facilitating the passing of colored light when said panels are in an excited selected state;

passing incident light through said panels to help facilitate producing a color image; and re-adjusting the direct current saturation voltage level for each panel to cause the luminance levels of the panels to be changed relative to one another to substantially optimize the color contrast balance between said panels.

3. A method for displaying color images, in accordance with claim 2, wherein re-adjusting includes:

using a microprocessor for supplying digital signals, each digital signal being indicative of a given color shading level to be exhibited by a pixel image produced from a selected one of said plurality of electrically operable pixel elements;

converting said digital signals into analog voltages indicative of substantially different color intensity levels; and amplifying said analog voltages for generating said discrete voltages.

4. A method for displaying color images in accordance with claim 2, further comprising:

energizing said panel means in response to a given shading level signal; and wherein energizing said panel means in response to a given shading level signal includes:

supplying said panel means with a video signal, said video signal having a select state and a deselect state; and switching said video signal between said select state and said deselect state to cause said panel means to display an image.

5. A system according to claim 4 wherein said panel means includes a plurality of liquid crystal panels.

6. A method according to claim 1 for adjusting the gamma characteristics of liquid crystal display means to optimize substantially the number of discrete optically distinguishable shading levels of a displayed image, wherein the step of using the liquid crystal display panel means includes:

passing light through the liquid crystal panel means to help facilitate producing the displayed image; and wherein said step of quantizing a video signal includes receiving said video signal, said video signal being indicative of a plurality of discrete shading levels; and wherein said step of adjusting said direct current saturation voltage level includes measuring the relative luminance level of the displayed image produced by said panel means in response to individual ones of said gray scale drive signals;

calculating a plurality of different adjusted biasing signal voltages for said panel means to cause the number of discrete optically distinguishable shading levels of the displayed image to be distributed substantially uniformly for the purpose of providing a liquid crystal panel means gamma curve correction; and storing liquid crystal panel means correction information indicative of said plurality of different adjusted biasing voltages.

7. A method according to claim 6, further comprising:

selecting from said stored correction information individual ones of said stored adjusted biasing voltages in response to receiving corresponding individual level indicating signals for determining a desired biasing voltage for said panel means;

causing selected desired adjusted biasing voltages to be generated in response to the selecting thereof to facilitate producing desired ones of a plurality of the discrete optically distinguishable shading levels for gamma curve adjustment purposes; and causing selected desired ones of the plurality of different biasing voltages to be applied to individual ones of said plurality of electrically operable pixel elements to be energized selectively to control the transmission of the light passing through said panel means to produce desired shading levels of resulting images.

8. A method according to claim 7 wherein said step of measuring includes:

generating a noncolor test pattern to cause said plurality of electrically operable pixel elements in said panel means to be energized to a substantially non-color shading level;

adjusting the bias voltage for the energized pixel elements to a sufficient saturation voltage potential to cause said panel means to produce a substantially noncolored light image;

measuring the luminance level of said panel means and the saturation voltage potential of the bias voltage;

noting the measured luminance level and the measured saturation voltage potential for said panel means;

changing said test pattern to cause the pixel elements in said panel means to be energized to a given color shading level;

adjusting the bias voltage for the energized pixel elements to a sufficient intensity level potential to cause said panel means to produce a colored image having a distinguishable luminance level relative to the previously measured luminance level;

measuring said intensity level potential and the luminance level of said panel means;

noting the measured intensity level potential and the luminance level of said panel means; and repeating said changing, adjusting, measuring and noting steps, until a substantially maximum number of distinguishable luminance levels have been generated between said saturation voltage potential and the last measured intensity level potential, whereby a gamma curve characteristic, may be produced for said panel means said gamma curve being indicative of a set of discrete luminance level values between a threshold voltage potential and said saturation voltage potential.

9. An apparatus for adjusting the gamma characteristics of liquid crystal display means to optimize substantially the number of discrete optically distinguishable shading levels of a displayed image, said liquid crystal display means including a plurality of electrically operable pixel elements, each pixel element being energizable to only a fully on state or a fully off state for exhibiting contrasting pixel images in accordance with the gamma characteristics of the liquid crystal display panel means, comprising:

means for generating a plurality of biasing signals, said plurality of biasing signals including a direct current threshold voltage level signal and a direct current saturation voltage level signal for helping to define the gamma characteristics of the liquid crystal display panel means;

means for energizing individual ones of said plurality of electrically operable pixel elements with said plurality of biasing signals so they can exhibit resulting pixel images when energized with a gray scale drive signal;

means for receiving a video signal indicative of a display image to be displayed repetitively over a large number of successive frames of video information;

means for quantizing said video signal into a plurality of gray scale drive signals, each individual gray scale drive signal being indicative of one of a multiple number of different luminance levels including a maximum luminance level and a minimum luminance level;

means for energizing individual ones of said plurality of electrically operable pixel elements with individual ones of said plurality of gray scale drive signals so each resulting pixel image exhibits one of said multiple number of different luminance levels over a large number of luminance levels; and means for adjusting said direct current saturation voltage level while energizing said plurality of electrically operable pixel elements with a certain individual one of said plurality of gray scale signals to adjust the gamma characteristics of the liquid crystal panel means to substantially maximize the luminance levels of the individual pixel images;

whereby a more uniform distribution of resulting distinguishable pixel images is produced in accordance with the adjusted gamma characteristics when said plurality of electrically operable pixel elements are energized by said gray scale drive signals to produce a large number of different shading levels.

* * * * *